S. J. SILL.
MACHINE FOR MOUNTING HOSE ON MANDRELS.
APPLICATION FILED JAN. 8, 1908.
910,735.
Patented Jan. 26, 1909.
2 SHEETS—SHEET 1.
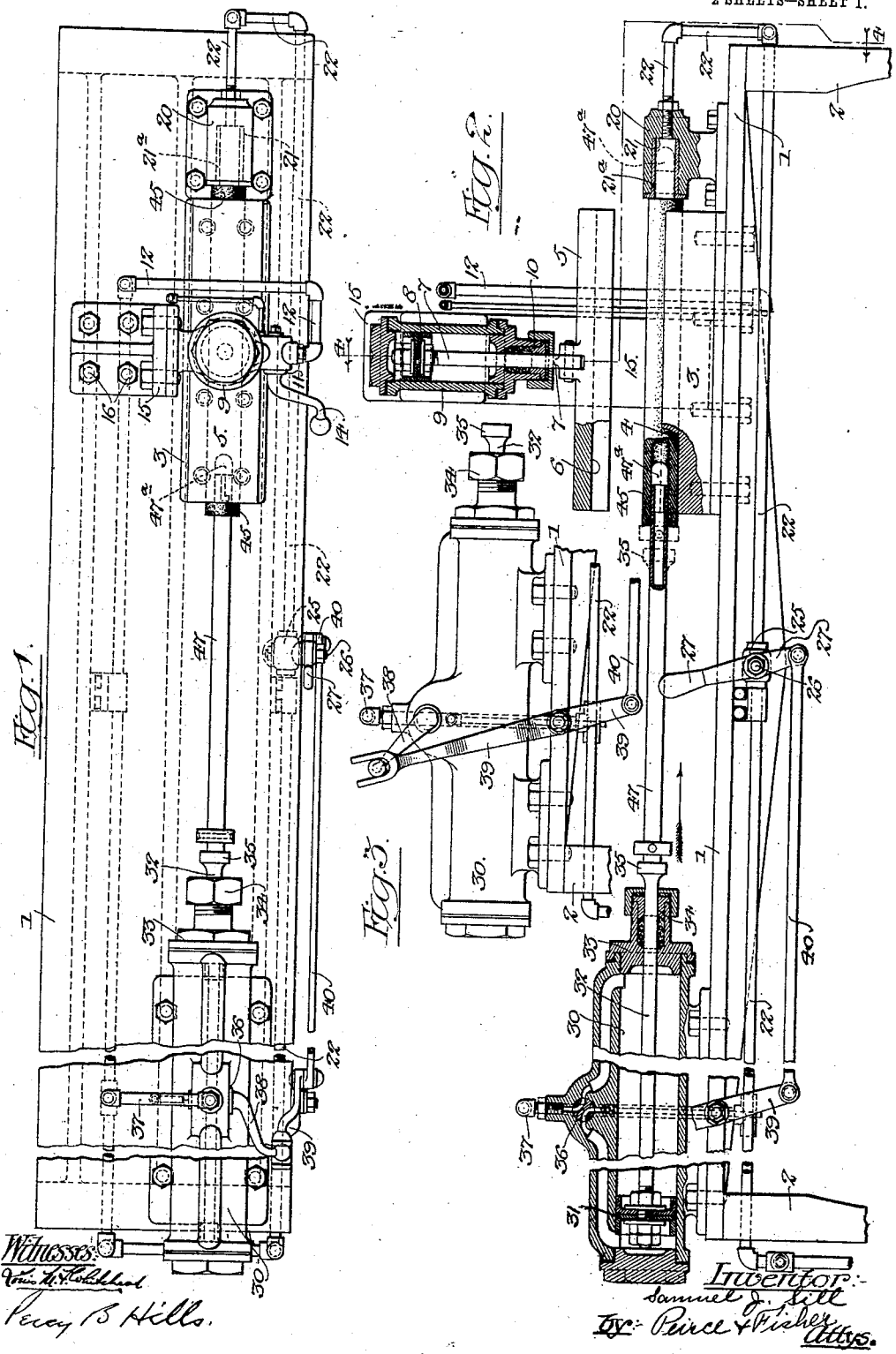

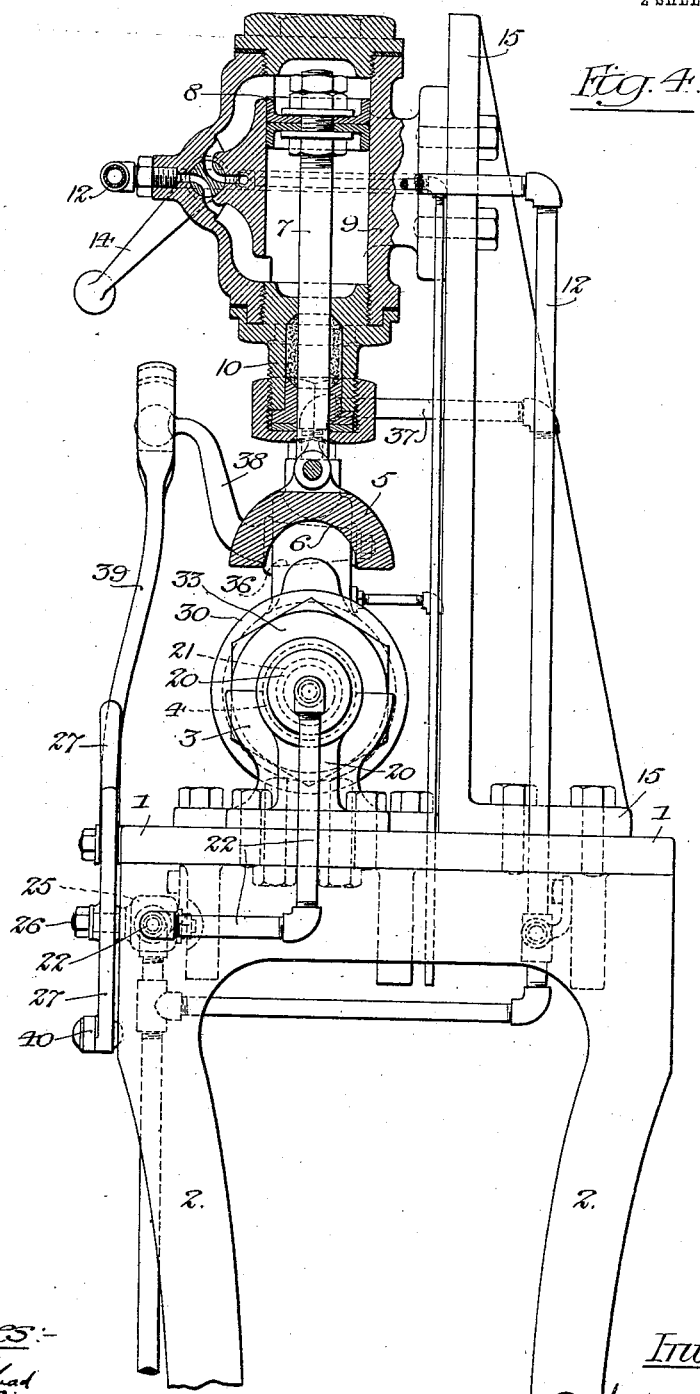

UNITED STATES PATENT OFFICE.

SAMUEL J. SILL, OF BUFFALO, NEW YORK, ASSIGNOR OF ONE-HALF TO HERBERT H. HEWITT, OF BUFFALO, NEW YORK.

MACHINE FOR MOUNTING HOSE ON MANDRELS.

No. 910,735.          Specification of Letters Patent.          Patented Jan. 26, 1909.

Application filed January 8, 1908. Serial No. 409,769.

*To all whom it may concern:*

Be it known that I, SAMUEL J. SILL, a citizen of the United States, and a resident of the city of Buffalo, in the county of Erie and State of New York, have invented certain new and useful Improvements in Machines for Mounting Hose on Mandrels, of which I do declare the following to be a full, clear, and exact description, reference being had to the accompanying drawings, forming part of this specification.

Rubber hose, such, for example, as is generally used in railway air brake systems, is usually formed by wrapping a plurality of plies or layers of frictioned duck around an inner tube of unvulcanized rubber and covering the outer surface of the hose with a sheet or layer of unvulcanized rubber; and, the hose thus formed is then submitted to the vulcanizing operation. Inasmuch as the inner tube of unvulcanized rubber is soft and more or less adhesive, there is danger of marring the surface of the inner rubber tube when the hose is being placed upon the mandrel that supports it during the vulcanizing process.

My present invention is designed to provide an improved machine whereby sections of hose may be readily mounted upon vulcanizing mandrels and without danger of marring the inner tube or lining of the hose.

The invention consists in the features of novelty hereinafter described, illustrated in the accompanying drawings and particularly pointed out in the claims at the end of this specification.

In the drawings, Figure 1 is a plan view of the improved machine. Fig. 2 is a front elevation with parts shown in section. Fig. 3 is a front elevation of one end of the machine. Fig. 4 is an end view with parts shown in section on the line 4—4 of Fig. 2.

The bed-plate 1 of the machine is supported upon suitable legs 2 at the ends thereof, and upon this bed-plate is mounted a block 3 from end to end of the upper surface of which extends a semi-cylindrical channel 4 adapted to receive the section of hose into which a mandrel is to be inserted. Over this lower block 3 extends an upper clamping block 5, the under surface of which is formed with a longitudinal cavity 6 corresponding to the cavity 4 of the lower block 3, these blocks 3 and 5 serving together to secure the hose section during the insertion of the mandrel therein.

As shown, the block 5 is fastened to the lower end of a piston rod 7 that is carried by a piston 8 within a cylinder 9 to which compressed air or other motive fluid will be admitted to effect the raising and lowering of the block 5. The piston rod 7 passes through a suitable stuffing box 10 at the lower end of the cylinder 9 and, at one side of the cylinder 9 there is provided a valve chamber 11 to which leads the air admission pipe 12 and within this valve chamber 11 there is provided a suitable valve for controlling the admission of air to the upper and lower ends of the air cylinder 9. The handle 14 of the controlling valve extends forwardly into convenient reach of the operator at the front of the machine. The cylinder 9 is shown as mounted upon a standard or bracket 15 that rises from the bed-plate 1 to which it is securely bolted, as at 16.

Upon one end of the bed-plate 1 is mounted a standard 20 that is formed with a chamber 21 to which compressed air will be admitted from the main air supply pipe 22. The inner end of the standard 20 is opposite and at a short distance from the corresponding end of the cavity 4 of the hose supporting block 3, so that when the section of hose is mounted upon the block 3, one end of the hose section may abut against the inner end of the standard 20, the chamber 21 of the standard at such time coming opposite the bore of the hose section. The passage of compressed air to the chamber 21 of the standard 20 is controlled by means of a suitable valve placed within a valve casing 25 interposed in the main supply pipe 22 and this valve is furnished with a stem 26 and with a hand-lever 27 whereby it may be conveniently manipulated by the operator when standing at the front of the machine.

Upon the bed-plate and at the opposite end of the machine is mounted an air cylinder 30 having a piston 31 therein, and the rod 32 of this piston extends inwardly through the cap 33 and through a suitable stuffing box 34; and, the inner end of the piston rod is furnished with a head 35 adapted to bear against one end of the mandrel that is to be inserted in the hose section after the latter has been mounted in position between the blocks or supports 3 and 5. The cylinder 30 is provided with a valve chamber 36 to which compressed air will be admitted by a pipe 37 and, within this valve chamber 36 there will be placed a suitable valve for controlling the supply of air to the opposite ends of the cylinder 30. The valve within the chamber 36 will be furnished with a crank 38 that engages the upper forked end of a pivoted lever 39 and, preferably, the lower end of this lever 39 extends downwardly and is united by a connecting rod 40 with the hand lever 27 of the valve which controls the passage of air to the standard 20 at the opposite end of the machine.

From the foregoing description the operation of the machine will be understood to be as follows: The operator will place within the cavity 4 of the lower block or support 3 the section of hose into which it is desired to insert a vulcanizing mandrel, such section of hose being designated as 45. He will then shift the hand-lever 14 so as to cause compressed air to pass to the top of cylinder 9 and thus force the upper block 5 down over the section of hose so as to securely retain it in place, the end of the hose section abutting snugly against the inner end of the standard 20, as indicated by dotted lines in the drawing. The operator will then insert one end of the vulcanizing mandrel 47 which is provided with a wooden plug 47ᵃ into the open end of the hose section, and the other end of the mandrel is held opposite the head 35 of the piston rod 32. He will then shift the hand-lever 27 so as to cause compressed air to pass to the chamber 21 of the standard 20, through which chamber 21 air will rush into and through the bore of the hose section, and this shifting of the hand-lever 27 will, through the medium of the lever 39, shift the valve within the casing 36 and cause air to pass to the outer end of the cylinder 30, thereby causing the piston rod 32 to force the mandrel into the hose. As the mandrel 47 is forced through the hose, the compressed air admitted to the hose from the chambered standard 20 will expand the hose and escape around the edge of the surface of the mandrel, as the opposite end of the hollow mandrel will be closed by the wooden plug or cap 47ᵃ. This slight expansion of the hose by the compressed air admitted thereto will enable the mandrel to freely enter the hose without danger of marring the surface of the soft rubber tube with which the hose section is lined. When the mandrel has thus been inserted into the hose, the operator will shift the hand-lever 27 so as to cut off the admission of air through the standard 20 and, this shift of the hand-lever 27 will correspondingly shift the lever 39 and the valve within the casing 36, thereby causing compressed air to pass to the inner end of the cylinder 30 so as to force the piston rod 32 back to its normal or idle position. The operator will then shift the hand-lever 14 so as to cause compressed air to pass to the lower end of the cylinder 9 in order to raise the block 5 away from the hose section. The mandrel with the hose section thereon will then be withdrawn and a detachable collar will then be slipped over one end of the mandrel. It will be observed that the chamber 21 of the standard 20 is of sufficient size to permit the free end of the mandrel to pass through the hose section a sufficient distance to enable the detachable collar to be readily placed upon such end of the mandrel.

It is manifest that the precise details of construction above set out may be varied without departure from the spirit of the invention.

Having thus described my invention, what I claim as new, and desire to secure by Letters Patent, is:—

1. A machine of the character described, comprising a support for the section of hose into which a mandrel is to be inserted, means for admitting air to the hose section, a piston rod for forcing the mandrel into the hose section, a cylinder and piston at one end of said support for actuating said piston rod and means at the opposite end of said piston rod against which the hose section may abut.

2. A machine of the character described, comprising clamping blocks for supporting the section of hose into which a mandrel is to be inserted, means for shifting one at least of said blocks towards and from the other, means for admitting air to the hose section held by said clamping blocks, a rod for forcing the mandrel into the hose section and a cylinder and piston for actuating said rod.

3. A machine of the character described, comprising a support for the section of hose into which a mandrel is to be inserted, means for admitting compressed air to one end of the hose section, a rod for forcing the mandrel into the opposite end of the hose section while the compressed air is being admitted to the hose, a cylinder and piston for shifting said rod and valve mechanism for controlling the flow of fluid pressure to the opposite ends of said cylinder.

4. A machine of the character described, comprising clamping blocks for the hose section into which a mandrel is to be inserted, one of said clamping blocks being movable, a cylinder and piston for controlling the movement of said movable clamping block, valve mechanism for controlling the flow of fluid pressure to said cylinder, means for admitting compressed air to the hose section held by said clamping blocks and means for forcing the mandrel into the hose section while fluid pressure is admitted thereto.

5. A machine of the character described, comprising a support for the section of hose into which a mandrel is to be inserted, a standard located adjacent one end of said support and against which one end of the hose section will abut, means for delivering compressed air through said standard to the bore of the hose section, a cylinder and piston located opposite the other end of said support and at a distance therefrom and a rod actuated by said piston for forcing a mandrel into the hose section.

6. A machine of the character described, comprising a support for the section of hose into which a mandrel is to be inserted, a standard arranged opposite one end of said support and having a chamber of a size to admit one end of the mandrel, means for admitting compressed air to the hose section, a piston rod arranged opposite the other end of said support, a cylinder for shifting said piston rod and means for controlling the movement of said piston rod.

7. A machine of the character described, comprising a support for the section of hose into which a mandrel is to be inserted, a standard arranged adjacent one end of said support and against which the hose section may abut, means for causing the passage of compressed air through said standard into the hose section, an air cylinder arranged opposite the other end of said support and provided with a piston rod, and valve mechanism for controlling the admission of air to and from said standard and said air cylinder.

SAMUEL J. SILL.

Witnesses:
HARRY L. CLAPP,
KATHARINE GERLACH.